US006632367B1

(12) United States Patent
Furlong et al.

(10) Patent No.: US 6,632,367 B1
(45) Date of Patent: Oct. 14, 2003

(54) METHOD FOR SEPARATING HEAVY ISOTOPES OF HYDROGEN FROM WATER

(75) Inventors: Louis E. Furlong, Sarasota, FL (US); Siegfried L. Stockinger, Richland, WA (US); Gabriel B. Collins, Largo, FL (US)

(73) Assignee: Molecular Separations, Inc., Sarasota, FL (US)

(*) Notice: Subject to any disclaimer, the term of this patent is extended or adjusted under 35 U.S.C. 154(b) by 0 days.

(21) Appl. No.: 09/777,318

(22) Filed: Feb. 6, 2001

Related U.S. Application Data (60) Provisional application No. 60/180,642, filed on Feb. 7, 2000.

(51) Int. Cl.[7] .............................................. C02F 1/28
(52) U.S. Cl. ...................................................... 210/673
(58) Field of Search ................................ 210/660, 673, 210/175, 269, 679

(56) References Cited

U.S. PATENT DOCUMENTS

| 3,879,525 | A |   | 4/1975  | Miyata et al. ............... 423/277 |
|-----------|---|---|---------|--------------------------------------|
| 4,322,394 | A |   | 3/1982  | Mezey et al. ............... 423/244  |
| 4,375,519 | A |   | 3/1983  | Howell et al. ................ 521/31 |
| 4,501,826 | A |   | 2/1985  | Meitzner et al. ............. 521/29  |
| 4,552,731 | A | * | 11/1985 | Vaughan ..................... 423/118  |
| 4,661,282 | A |   | 4/1987  | Clark ......................... 252/179 |
| 4,784,672 | A |   | 11/1988 | Sircar .......................... 55/26 |
| 4,805,317 | A |   | 2/1989  | Inglis et al. ................... 34/1  |
| 4,929,381 | A |   | 5/1990  | Clark ....................... 252/174.25 |
| 5,194,244 | A |   | 3/1993  | Brownscombe et al. .... 423/700 |
| 5,204,076 | A |   | 4/1993  | Farnos et al. ............... 423/700  |
| 5,395,406 | A |   | 3/1995  | Clavenna et al. .......... 48/198.7    |
| 5,411,712 | A |   | 5/1995  | Woodmansee et al. ..... 422/186      |
| 5,585,408 | A |   | 12/1996 | Harris et al. .................. 521/33 |
| 5,779,767 | A |   | 7/1998  | Golden et al. .................. 95/96  |
| 5,998,324 | A |   | 12/1999 | Salvador Palacios et al. . 502/22    |
| 6,110,373 | A | * | 8/2000  | Patterson et al. ........... 210/673  |

* cited by examiner

Primary Examiner—Ivars Cintins
(74) Attorney, Agent, or Firm—MacCord Mason PLLC

(57) ABSTRACT

Isotope water molecules, e.g., HTO and $T_2O$, are separated from contaminated water by conveying the contaminated water through a separation chamber containing a separation material formed of an inorganic substrate with hydration sites having multiple associated waters of hydration, whereby the waters of hydration are preferentially replaced by the isotope water molecules. The discharged water, which is lower in concentration of isotope water molecules due to the preferential replacement, can be conveyed through a second separation chamber containing additional separation material to remove additional isotope water molecules. Following saturation, the separation material is heated to separate the isotope water molecules. The relatively concentrated water driven off by heating is stored or otherwise disposed of, and the separation material is reused.

7 Claims, 8 Drawing Sheets

TRS Process: Adsorption Mechanism

Fig. 2
Tritium Adsorption Curve using 4 Teflon Columns in Series
245μCi/L CP&L Feed Concentration Fig. 4
Tritium Adsorption Curve using 2 Teflon Columns in Series
0.3μCi/L Hanford Process Sample (ETF effluent)

Fig. 5
Final Stage of Media Regeneration
Fluidized Bed Dryer

METHOD FOR SEPARATING HEAVY ISOTOPES OF HYDROGEN FROM WATER

This application claims benefit of U.S. provisional application Ser. No. 60/180,642, filed Feb. 7, 2000.

BACKGROUND OF THE INVENTION

(1) Field of the Invention

The present invention relates to the separation of heavy isotopes of hydrogen, and in particular to a process and apparatus for separating tritium oxide (HTO) from contaminated water by passing the contaminated water through a molecular separation material containing hydration sites, i.e., sites with multiple associated waters of hydration, to selectively replace the waters of hydration with water molecules that include the heavy hydrogen isotopes.

(2) Description of the Prior Art

Nuclear power plants must routinely deal with the replacement and disposal of contaminated water that is laden with heavy isotopes of hydrogen, namely deuterium oxides, tritium oxides and deuterium-tritium oxides. Tritium in particular is radioactive having a half-life of about twelve and one half years emitting beta particles to form helium.

Periodically, the contaminated water from nuclear reactors must be replaced. It has become industry practice to dispose of the old contaminated water by simply discharging it as allowed by their permits and licenses over ground areas. This is stressful to the environment as the deuterium oxides and tritium oxides are now known to have contaminated ground water sources. There appears to be no effective and economically practical means for otherwise disposing of this contaminated water so this practice of disposal continues.

Tritium is a radioisotope of hydrogen which decays to helium$^3$ by beta emission with a half life of 12.3 years. Tritium in the environment exists mainly as tritiated water (HTO) for example as in wastewater discharged from nuclear facilities. A tritium concentration of 1 $\mu$Ci/L in water, is equivalent to a tritium-to-hydrogen atom ratio of $3.12 \times 10^{-13}$. Deuterium, another isotope of hydrogen with an atomic weight of 2.0, is also present in water at a natural concentration of about 150 ppm or at a deuterium to hydrogen atom ratio of $6.75 \times 10^{-4}$.

Tritium is typically found in dilute form as HTO in the oxidized state. The US EPA has set a drinking water standard of 0.02 $\mu$Curies/L for HTO. Tritium is used in nuclear weapons systems and is a frequent by-product of nuclear processes. It is estimated that there are 20,000 Curies of tritium at the US DOE's Hanford site and more at the Savannah River Site (Jeppson 1999, Miller 1999). It has also been estimated that greater than 90% of the total dose from radionuclides to downstream water users is HTO as contaminated aquifers have reached the Columbia and Savannah Rivers. These rivers remain well below the drinking water standard but HTO in these streams is a concern.

A typical nuclear power plant produces 500 Curies per reactor per year and again it has been established that over 90% of the dose entering the environment from these plants is HTO. As with the US DOE sites, lakes and rivers to which these power plants discharge remain below the drinking water standard.

Heretofore, there have not been practical processes for separation of HTO from light water at these low concentrations (parts per billion to parts per trillion or even lower). In high concentrations, distillation and cryogenic processes are practiced. Electrolysis followed by gaseous separation processes is also practical at high concentrations.

Selective adsorption is a common method to attack removal of trace quantities in liquid and gas streams. In this process, the selective site is the hydration region surrounding a cation, typically aluminum +3, anchored to a substrate. Most salts have hydrates and aluminum sulfate is reported to have up to 18 waters of hydration (Lide, 1996). All of these potential hydration sites are probably not accessible in a supported site configuration. It has also been reported that some cations have two spheres of hydration sites with the closer sphere having a higher heat of hydration. In addition to having a high total hydration capacity it is necessary for the system to be selective for heavier water isotopes.

SUMMARY OF THE INVENTION

In accordance with the present invention, a process and related apparatus is described for separating tritium oxide (HTO, $T_2O$), i.e., heavy water, from tritiated water. The process and apparatus may also be used in separating deuterium oxide (HDO, $D_2O$) and, deuterium-tritium oxides from waste water. As used herein, water molecules of the formula $H_2O$ will be referred to as light water molecules, or simply water molecules, while water molecules in which the hydrogen atoms contain one or two neutrons will be referred to as isotope water molecules, or isotope molecules.

In the described process, a portion of the isotope water molecules are removed from contaminated water, i.e., water containing a small amount of isotope water molecules, through selective adsorption by contacting the contaminated water with a molecular separation material containing sites carrying multiple associated waters of hydration. In the process, isotope water molecules present in the contaminated water selectively replace a portion of the waters of hydration associated with the hydration sites. The molecular separation material can then be separated from the water, reducing the percentage of isotope molecules in the water. After separation, the molecular separation material can be regenerated by removing the isotope molecules, and again used to separate isotope molecules.

Generally, the separation material of the present invention is comprised of either an organic or inorganic high surface area support medium having a plurality of hydration sites, i.e., sites with associated waters of hydration. The effectiveness of the separation material is determined by the number of hydration sites exposed to the contaminated water, and to the number of waters of hydration at each site.

The support structure or medium may be, for example, a polymer, such as polystyrene/divinyl benzene (PSDVB), or polyacrylic/divinyl benzene (PADVB). These polymers are commonly used as supports in ion exchange resins in the preparation of ion exchange resins. The polymer may be functionalized, e.g., sulfonated or phosphonated to provide the sites for attachment of metal or other ions with the required associated waters of hydration. The metal ions may be attached by reaction of the sulfonated or phosphonated resin with a salt, e.g., a sulfate or nitrate salt, in which the metal to be used for the site is the cation. The procedure was applied for $RSO_3H$ with 2%, 4% and 12% cross-linking, 60 mesh, 100–200 mesh and 200–400 mesh screened for size.

In a preferred embodiment, $Al_2(SO_4)_3$ is reacted with the resin to provide the following structure:

or structures with only one or two SO₃ linkages to the resin.

The relative effectiveness of various cations was measured for selective adsorption of tritiated water at low concentration (125 μCi/L) in light water. The substrate was a commercial polyacrylic/divinylbenzene resin loaded with the cations as sulfates at one normal concentration and subsequently rinsed with deionized water until the rinse conductance indicated no change. The cations are ranked in the table below by relative adsorption of HTO per unit wet volume of adsorbate.

TABLE 1

Cation Effects on Selective Adsorption of Tritium

| Cation | Theoretical Number of Hydration Sites (as sulfates) | Relative HTO Adsorption (on Resin) |
| --- | --- | --- |
| Al + 3 | 18 | 10 |
| Na + 1 | 10 | 9.5 |
| Zn + 2 | 7 | 7.7 |

It is important to note that the present invention involves the replacement or substitution of the waters of hydration associated with the site, and not the replacement of the cation or anion as is normally practiced in using this type of resin. Thus, while the resins employed are referred to in some instances as ion exchange resins, since this is the purpose for which they are commonly employed, their function in the present invention is the molecular exchange of isotope water molecules with the associated light water molecules. If one begins with a dry resin, the tritiated water will be preferentially adsorbed and held.

Preferably, each hydration site will have at least 5, and preferably from about 7 to about 20 waters of hydration. Various molecules that form associations with water molecules, i.e., waters of hydration can be used in the present invention. The cationic portion of the hydration site may be non-metallic, e.g., an ammonium cation ($NH_4^+$), or a metallic cation. Of the metal cations, aluminum is especially suitable due to the large number of waters of hydration associated with aluminum salts. However, other metal cations, such as magnesium, copper, zinc, cobalt or chromium can also be employed. Depending upon the structure of the support and the manner of its production, the anionic portion of the hydration site molecule can be nitrates, sulfates, chlorides, hydroxides, or phosphates.

The molecular separation material may be in various physical forms, so long as a large surface area with metal sites is exposed to the contaminated water. For ease of manufacture and subsequent regeneration, and the availability of a large surface area, the material is preferably in the particulate form, e.g., beads of from about 15 mesh to about 400 mesh. Other physical forms, such as gels, can also be used.

When the substrate is an organic resin, the resin is preferably a highly sulfonated PS/DVB resin with 10 to 12% cross-linking, loaded with aluminum cation. Best results are achieved with resins having the key maximum number of sites per unit volume.

Instead of using a PS/DVB resin as described above as the support for the hydration sites, it has been found in accordance with the present invention that additional advantages are provided by the use of an inorganic support. These supports include aluminas, silicas, and the aluminum-silicates or zeolites. These substrates are treated in much the same manner as the PS/DVB substrates by first functionalizing the substrate, and then attaching metal cations, or by replacing the —OH group with a metal cation with multiple waters of hydration.

That is, acidic or basic alumina or silica, or a mixture thereof, e.g., a zeolite, may be functionalized by reaction of the —H or —OH groups, respectively, with $H_2SO_4$, and then reacting the functional group with $Al_2(SO_4)_3$, resulting in an inorganic polymer having the formula:

wherein R is alumina or silica, or mixtures thereof, A is an aluminum, magnesium, copper, zinc or cobalt cation, and Y is a sulfate, nitrate, chloride or phosphate cation. Other inorganic supports, such as magnesium silicate could also be used.

Alternatively, the acidic alumina or silica can be reacted with a metal halide capable of attracting multiple waters of hydration to replace the —H group. For example, $AlCl_3$ can be reacted with the acidic substrate to produce an inorganic polymer with the following formula:

This polymer can be used as the adsorption material, or the polymer can be reacted with $Al_2(SO_4)_3$ to produce an adsorption polymer with the following structure:

Inorganic polymers, while performing much like organic polymers in selective attachment of tritium molecules, have additional advantages in rehydration of the polymer. Specifically, after the polymer has been loaded with tritium molecules, the polymer is heated, usually with heated air, to separate the tritium molecules and regenerate the polymer for further use by removing the waters of hydration. Regeneration using organic polymers, such as PS/DVB resins, is a slow process, since waters of hydration are difficult to remove at temperatures that will not degrade the organic polymer, i.e., temperatures below about 140° C.

However, with inorganic polymers, the regeneration temperature can be significantly higher, e.g., in the range of from about 140° C. to about 300° C. This can substantially reduce the regeneration times required, e.g., from about 12 to about 100 hrs. to about ½ to about 2 hrs. Therefore, substantially greater efficiencies can be achieved, permitting the utilization of smaller and fewer treatment modules, and a smaller quantity of polymeric material.

In addition, the contaminated water can be heated to a vapor phase prior to adsorption of the tritium molecules, resulting in very rapid adsorption and desorption. Also, at the higher temperatures, the amount of water held nonselectively is dramatically reduced.

The configuration of the apparatus used to practice the process of the invention will vary depending upon several factors, including the volume of water being treated, and the manner of disposal of the water discharge streams. In general, however, the apparatus will include at least one separation chamber, a supply conduit for conveying contaminated water into the separation chamber from a supply source, and a first discharge conduit for removing diluted waste water from the separation chamber. Provision may also be made for periodic replacement of the molecular separation material. The apparatus also includes a means for regeneration of the separation material to remove adsorbed isotope molecules and regular water molecules. For example, the loaded separation material can be exposed to heat to drive off the isotope molecules and the light water molecules by selective evaporation. This desorbed or dehydrated separation material can then be used directly, or rehydrated with light water molecules prior to use.

DETAILED DESCRIPTION OF THE INVENTION

Most experiments were performed using aluminum as the cation with the addition of low concentrations of sodium to remove exchangeable hydrogens not replaced by aluminum. This was done to minimize possible H+/T+ isotope exchange which would complicate analysis and regeneration.

A large number of substrates, both organic and inorganic, have been screened with the critical factor being the density of sites per unit wet volume. This is analogous to the milli-equivalent per milliliter figure of merit used in the ion-exchange resin field. The accessibility of sites is also important, particularly noted with highly cross-linked resin substrates which do not perform as well as predicted.

Figure 1:
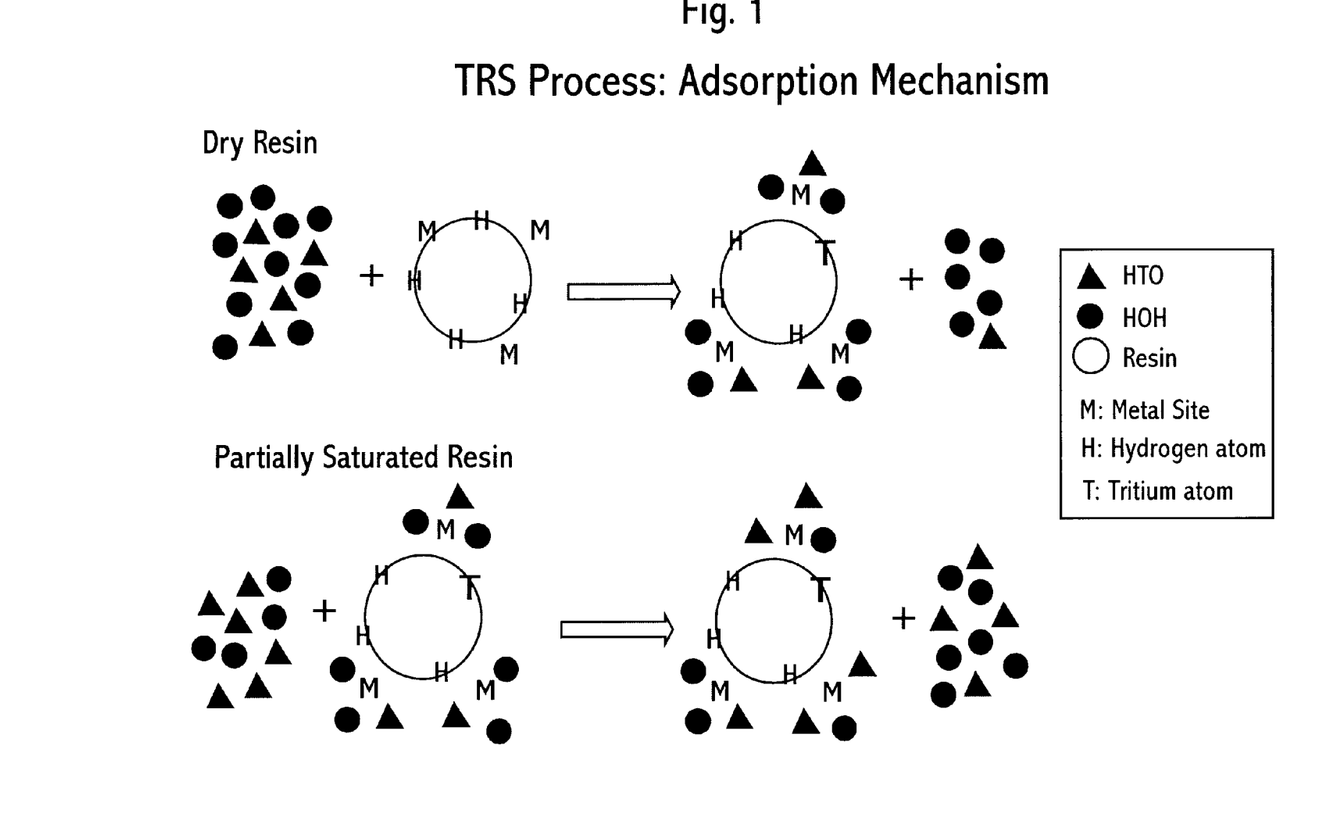
FIG. 1 illustrates the adsorption of tritiated water as a water of hydration.

The adsorption of tritiated water as a water of hydration is concentration dependent as illustrated in FIG. 1. In FIG. 1, the relative concentration of HTO is enhanced in the illustration in order to aid visualization. Actual HTO concentrations are in the parts per trillion range. In any event, the adsorption resin is shown starting in a dry state with the metal sites unhydrated. In this simplified example each site can have three hydrates. The tritiated water is preferentially held lowering the concentration in the exit water. The possible exchange of tritium for hydrogen on the support resin is also illustrated. If more concentrated tritiated water comes into contact with the partially saturated resin, still more HTO is selectively adsorbed. The resin will reach an equilibrium and no additional HTO will be adsorbed. The resin must then be regenerated by heating the resin to drive off all water, the hydrates and most particularly the tritiated hydrate being the last waters removed.

A pilot plant was built using as adsorption columns Teflon tubes, 2 meters tall and 2 cm in diameter. Up to four of these Teflon columns were used in series. The feed lines were teflon and the valves typically polypropylene for low temperature and Teflon for higher temperature operations. Pumps were peristaltic. The regeneration system was glass with teflon fittings, the major vessel being 7 cm in diameter and one meter tall. The system was thus non-metallic to preclude the introduction of unwanted cations.

Typical flow rates were 0.5 L/h, on the order of 3 to 4 cm/min linear velocity. The feed was pumped vertically upward in the column(s) and the adsorption material was typically added dry in small increments from the top of the column. Product water samples were collected in vials for subsequent scintillation counting. Multiple feed samples were counted and typically 30 product samples were used to define the adsorption curve which was S-shaped. Sampling was normally continued until the column(s) were saturated.

Over 80 runs have been conducted using standard test solutions, samples from Hanford and Brookhaven, and coolants from PWR nuclear power plants. Selective tritium removal has been consistently demonstrated as shown by the results in the Table 1.

TABLE 1

Selective Tritium Adsorption Results

| HTO Feed Conc. Pci/L | Source | Number Of Columns | Maximum Decrease % | Normalized[a] HTO Adsorption per Unit Vol and Initial Concentration |
|---|---|---|---|---|
| 1000 | CP&L (PWR) | 1 | 69 | 9.5 |
| 245 | CP&L (PWR) | 4 | 97 | 10 |
| 125 | MSI Standard | 2 | 93 | 9.8 |
| 2 | BNL Groundwater | 2 | 83 | 6.1 |
| 0.3 | Hanford ETF Sample | 2 | 78 | 2.6 |

[a]Normalized integrated adsorption per unit volume of media adjusted for the initial feed concentration.

Table 1 shows the maximum percentage decrease in tritium content from the feed concentration. Five feeds and differing volumes of resin were used in these runs. The reductions were significant for all feed concentrations but were smaller for the feeds with lower tritium concentrations. For all feed concentrations the percent decrease increases with resin volume. This result allows design of systems to achieve varying separation targets. In all cases the resin saturates relative to the feed and must be regenerated for the next cycle. Several of the individual runs are illustrated in the figures which follow.

Figure 2:
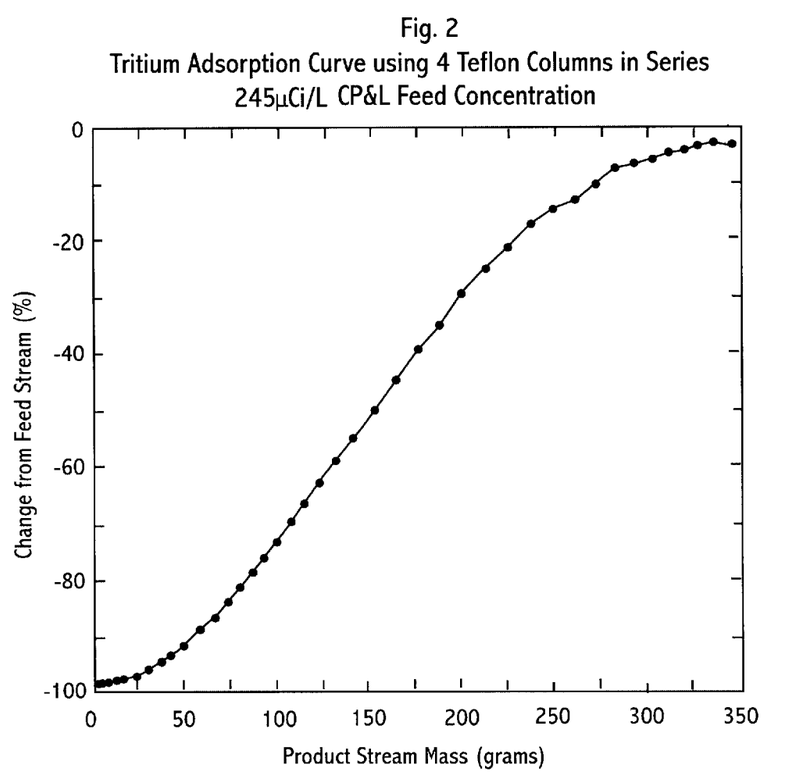
FIG. 2 shows the percent decrease of tritium as a function of the total water processed for the four column run.

FIG. 2 shows the percent decrease of tritium as a function of the total water processed for the four column run. This feed was a sample from an operating pressurized water reactor (PWR) nuclear utility. The first water exiting the columns is 97% reduced in tritiated water relative to the feed. Thus, in the case with the 245 $\mu$Ci/L feed, the outlet water was at 6 $\mu$Ci/L. The outlet tritium concentration increased until the resin was saturated, as indicated by the s-curve approaching the zero axis at the top. Complete saturation was considerably later (higher volume) but operational saturation would of course be set earlier dependent on product release/recycle targets. The resin requires regeneration for reuse after saturation.

Figure 3:
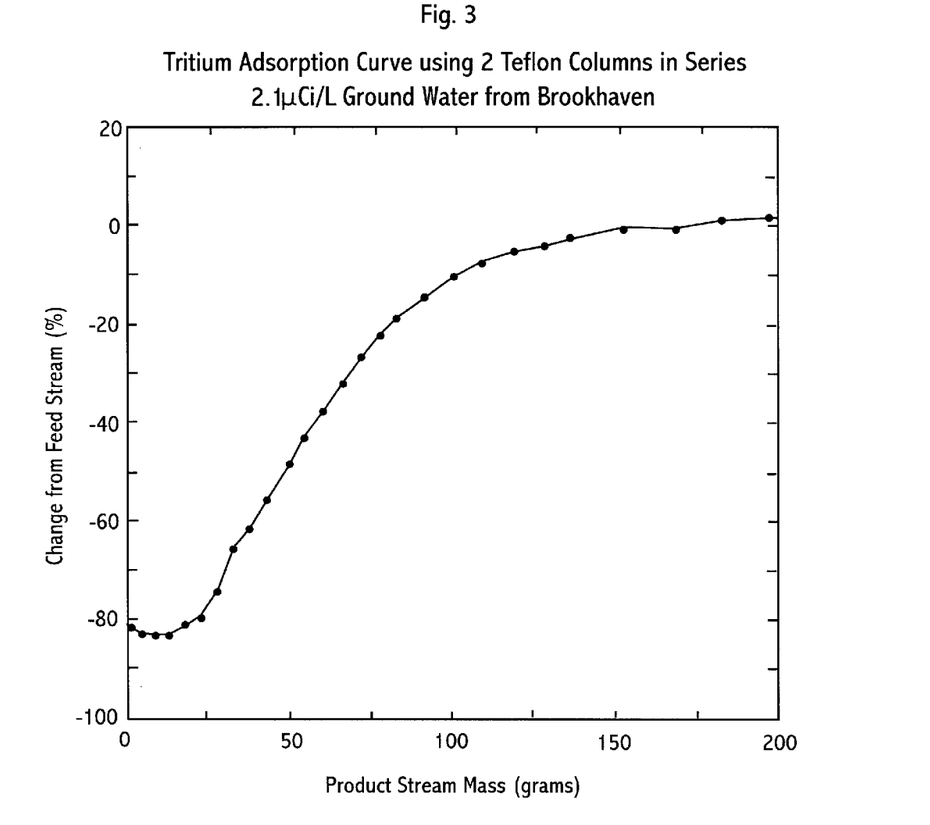
FIG. 3 FIG. 3 shows selective removal of tritiated water from a sample of groundwater supplied by Brookhaven National Laboratory.

FIG. 3 shows selective removal of tritiated water from a sample of groundwater supplied by Brookhaven National Laboratory. Groundwater concentrations are typically much lower than those found in nuclear power plant coolant streams. This sample was first deionized in a mixed bed ion exchange system. The initial 2.1 $\mu$Ci/L concentration was reduced by 83% to 0.36 $\mu$Ci/L. Two columns were not sufficient to reduce the concentration to the drinking water standard. More columns would be required to reduce the concentration further.

Figure 4:
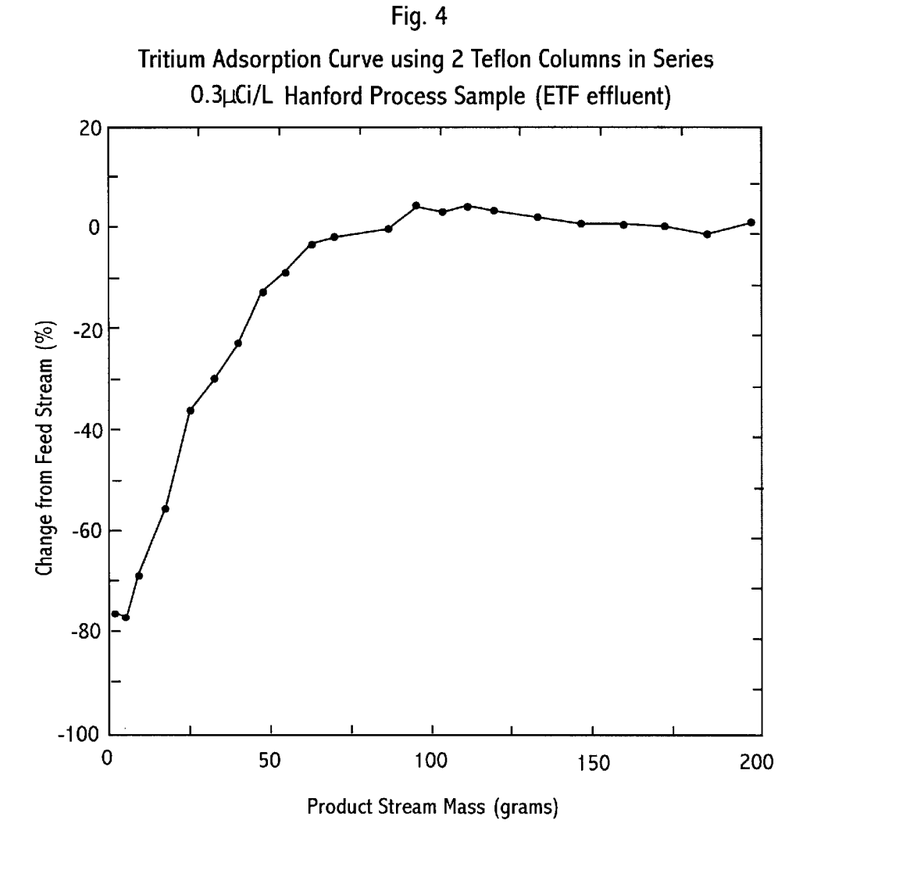
FIG. 4 illustrates selective adsorption of tritiated water from a Hanford process Sample.

FIG. 4 illustrates selective adsorption of tritiated water from a Hanford process Sample. The US DOE's Hanford Site was active in nuclear defense programs from 1944 to 1989 and significant volumes of tritiated water were produced as by-products. The site operates an Effluent Treatment Facility (ETF) which effectively removes radioactive materials except for tritium. Thus no pretreatment was required for this sample. FIG. 4 illustrates removal of HTO from the ETF product stream. Again significant reductions were achieved. This run used an inorganic adsorption substrate. Additional adsorption media volume will be required to achieve the drinking water standard.

Regeneration of the adsorption media is necessary to prepare the media for the next cycle and to produce a more concentrated HTO stream for disposal. Regeneration can be accomplished either in the adsorption vessel or in a separate system as the media can be easily fluidized. Regeneration is accomplished in three phases. First, the void water is stripped out using air. Second, bulk water is removed by hot gas (typically air or nitrogen at 100–110° C.). Third, waters of hydration are removed at higher temperatures (140–150° C.).

Figure 5:
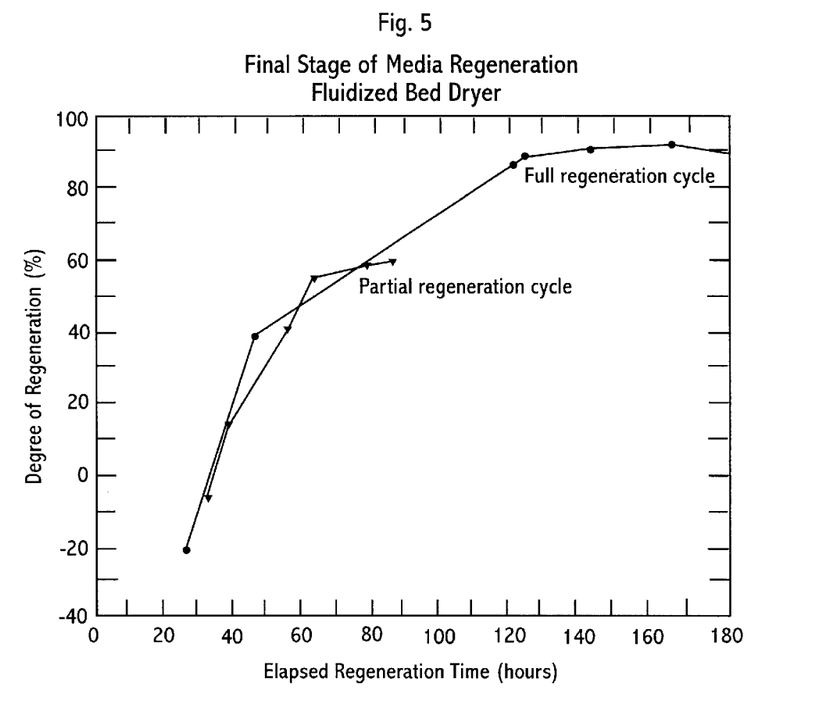
FIG. 5 illustrates media regeneration to remove adsorbed HTO.

FIG. 5 illustrates media regeneration to remove adsorbed HTO. The HTO remaining on the media was measured by removing aliquots of the essentially dry solid and desorbing HTO into pure deionized water ( reversing the adsorption process). HTO was very difficult to remove, being held significantly more strongly than light water.

Figure 6:
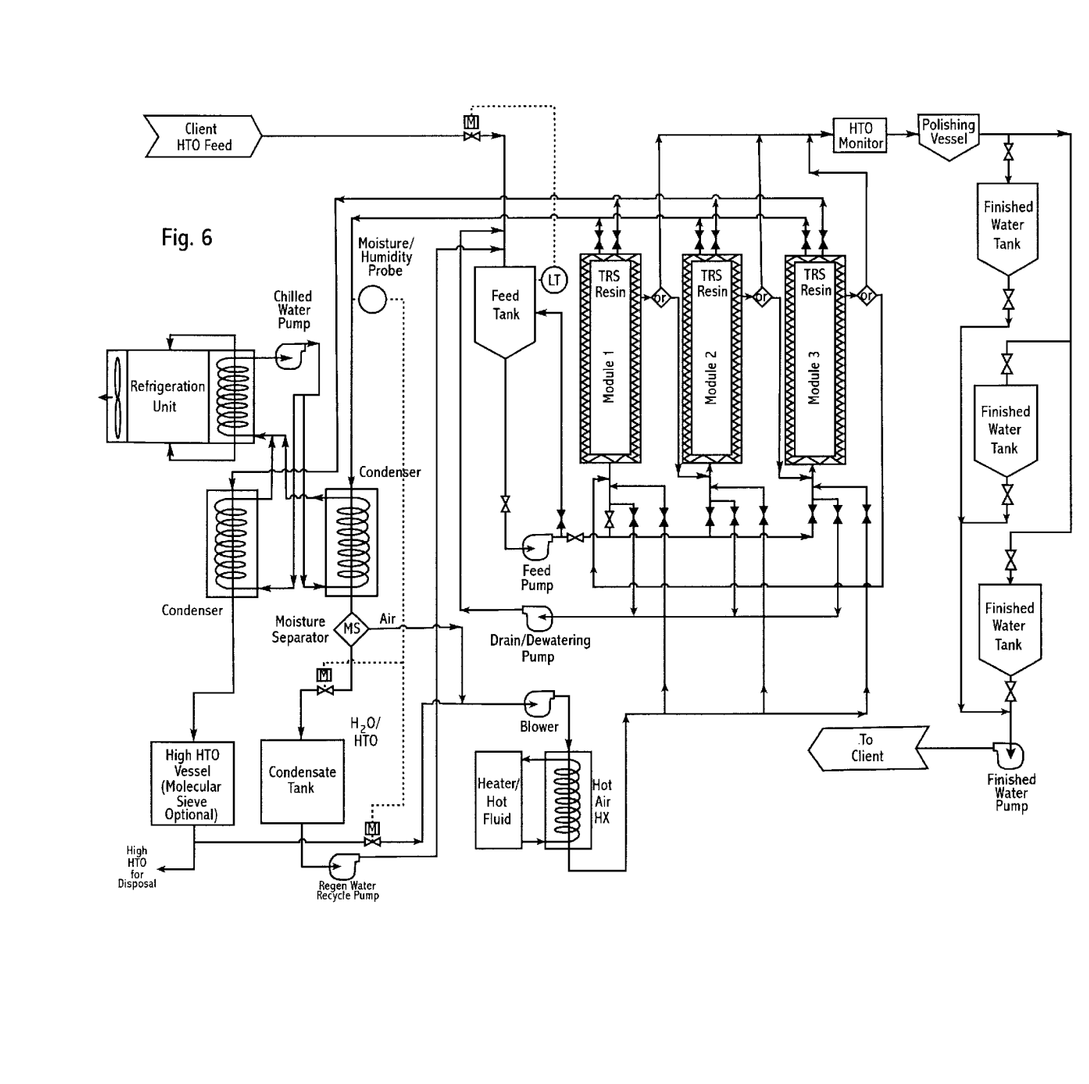
FIG. 6 shows a small scale system (<5 gpm) for tritium removal.

FIG. 6 shows a small scale system (<5 gpm) for tritium removal. As illustrated it would employ three stainless steel adsorption modules connected in series. More modules could be added dependent on HTO feed concentrations within the modules. The adsorption cycle would be upflow through the modules in series. When the first module is saturated the feed would be switched to the second module and the first module would begin the three phase regeneration. The water removed in the first and second regeneration cycles would be recycled to the feed tank. The third stage of regeneration would use the higher temperature and a separate condensing system. The concentrated HTO can be condensed, captured for storage, disposal or possible uses.

Figure 7:
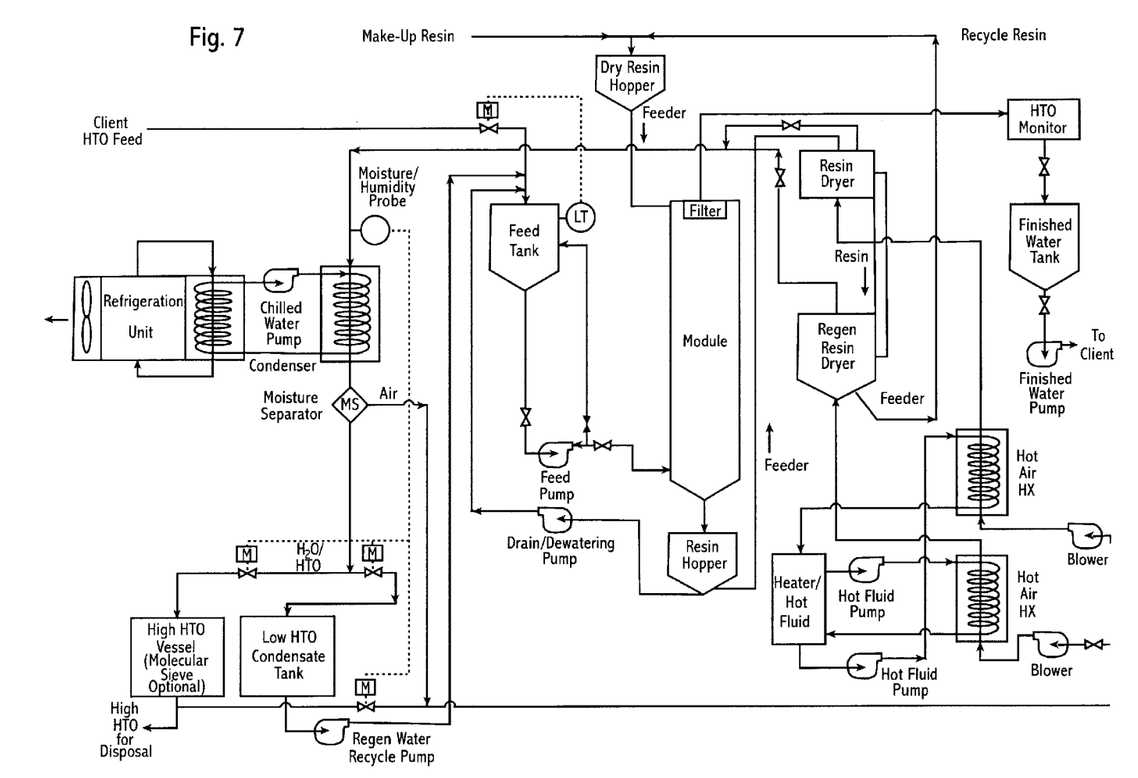
FIG. 7 illustrates a continuous, counter current system for larger scale (>10 gpm) applications.

FIG. 7 illustrates a continuous, countercurrent system for larger scale (>10 gpm) applications. The peripherals are similar to the small scale system. The essential difference is the use of a large continuous use column with dry media being added at the top and saturated, wet media being removed at the bottom. The regeneration would be carried out in separate dryers being operated at different temperatures for removal of HTO.

Figure 8:
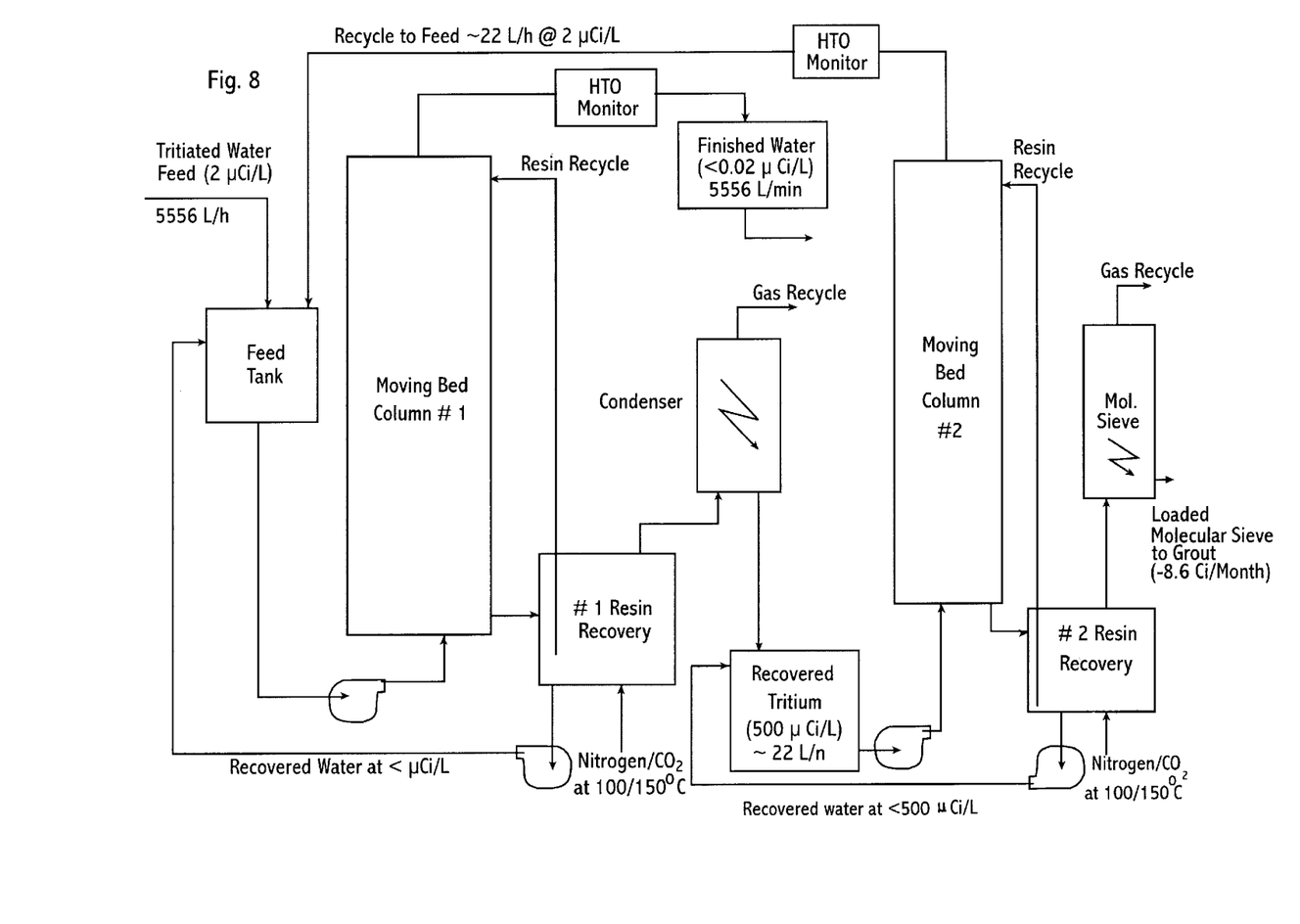
FIG. 8 is a schematic illustration of another separation apparatus.

In the apparatus illustrated in FIG. 8, tritiated water at low concentrations in light water is preferentially loaded on a proprietary adsorption bed as hydrated water, allowing the tritium-depleted stream to pass through the bed. Cation sites attached to the bed media are employed to preferentially remove the tritiated water. This loading process is conducted at about 30° C. The tritiated water feed stream is introduced at the bottom of column #1, as shown in FIG. 4. The water flows up through the bed where it is removed from the top of the column as a depleted tritiated water stream. The bed media material is introduced at the top of column #1 and flows downward to form a countercurrent flow through the column. Tritiated water adsorption on the bed, was found to increase with feed concentration and bed volume. Depleted tritiated water streams with a tritium concentration below the EPA drinking water limit are possible by using the appropriate bed length and residence time to effect the necessary exchange.

As the media moves down through the column and becomes loaded, it is removed from the bottom of the column to a tritium-removal and media-regeneration system. Free water is drained from this removed media and recycled back to the column's tritiated water feed tank. More than one media-receiving tank will be used to provide the capability of continuous processing through the column. The removed media is then heated to a moderate temperature of about 105° C. to remove the remainder of the interstitial water and the lightly held hydration water. These waters are returned to the column's feed tank for reprocessing and constitute approximately 50% of the feed-flow stream. The media-bed material is then heated to about 145° C. and the more strongly bonded hydrated water (including the preferentially held tritiated water) is swept off the media as water vapor to a condenser. The condensate, containing the bulk of the tritiated water, is collected as liquid in a receiving tank. The volume of condensed water amounts to 0.25 to 0.5 percent of the original volume of feed and contains about 99 percent of the tritiated water. The gas from the condenser is recycled to a heater for reuse. The regenerated adsorber material is then recycled to the column for reuse.

This smaller volume of tritiated water is then pumped to the bottom of column #2. This column is smaller, has a moving bed similar to column #1, and receives media at the top of the column. The tritium is loaded on the bed media, and the tritium-depleted stream is removed from the column and recycled back to the feed tank of column #1. This recycled stream constitutes only a small fraction of the volume of the feed stream to column #1.

The media is removed from the column to the #2 media-recovery system, where it is drained and the tritium is removed the same as for the #1 media-recovery system. The drained water is pumped back to the #2 column feed tank. The dehydrated media is recycled to its respective column for reuse to load additional tritiated water with no detrimental effects.

Tables 2 and 3 compare the results of various substrates and loading materials.

Certain modifications and improvements will occur to those skilled in the art upon a reading of the foregoing description. It should be understood that all such modifications and improvements have been deleted herein for the sake of conciseness and readability but are properly within the scope of the follow claims.

TABLE 2

Material Information

| ID | Chemical | Company | Loading Materials | Other Stats |
|---|---|---|---|---|
| I7 | Silica Gel | Sigma-Aldrich | None, natural loaded, probably OH— | Grade 636, 60A, 35–60 mesh |
| I6 | Molecular Sieve | Fisher Scientific | Base:Alumina-Silicate, Cation:Na | Grade 514, 4A, 8–12 mesh |
| ICS9 | Basic Alumina | Porocel | HCl, then Al2(SO4)3 | Dryocel 848, LOI 3–4%, 1/16" |
| ICS10 | Basic Alumina | Porocel | HCl, then Al2(SO4)3 | Dryocel 848, LOI 6–7%, 1/16" |
| ICS11 | Basic Alumina | Porocel | HCl, then Al2(SO4)3 | Maxcel 727, LOI 6–7%, 1/16" |
| INA8 | Acidic Alumina | Sigma-Aldrich | NaCl, then Al2(SO4)3 | Acidic, 58A, ~150 mesh |
| ISAN14 | Basic Silica Gel | Davison Chemical | H2SO4, then Al2(SO4)3 and NaOH | Grade 15, 20A, 40–60 mesh |

TABLE 3

Column Results

| Column Test ID | | C66-17 | C70-16 | C74-ICS9 | C75-ICS10 | C76-ICS11 | C79-INA8 | C80-ISAN14 |
|---|---|---|---|---|---|---|---|---|
| Resin ID | | New 17 | New 16 | New ICS9 | New ICS9 | New ICS11 | New INA8 | New ISAN14 |
| Volume | mL | 1300 | 650 | 650 | 650 | 650 | 1300 | 650 |
| Temperature | deg. C. | 30 | 30 | 30 | 30 | 30 | 30 | 30 |
| Delta Temperature | deg. C. | 3.8 | 21.7 | 8.1 | 9.7 | 5.5 | 5.6 | 11.3 |
| Pressure Max. | psig | 6.0 | 4.7 | 3.2 | 4.7 | 2.0 | 20.0 | 5.2 |
| Time for Mods | Hrs | 2.63 | 1.23 | 0.92 | 1.45 | 1.37 | 3.08 | 1.37 |
| HTO Conc. | Ci/L | 120.3 | 120.2 | 123.7 | 123.7 | 124.1 | 124.8 | 124.2 |
| Mass Resin | g | 612.2 | 522.8 | 454.6 | 478.3 | 460.8 | 1502.3 | 435.5 |
| Flow Rate | ml/hr | 389.5 | 375.6 | 514.5 | 326.8 | 333.0 | | 354.8 |
| Linear Flow | cm/min | 2.54 | 2.72 | 3.65 | 2.31 | 2.45 | 2.17 | 2.45 |
| Bound HTO | g | 572.4 | 246.0 | 305.6 | 303.8 | 300.5 | | 253.2 |
| Void HTO | g | 440.2 | 210.7 | 159.5 | 163.5 | 148.2 | | 225.2 |
| Ci in Bound HTO | Ci | 68.9 | 29.6 | 37.8 | 37.6 | 37.3 | | 31.4 |
| Equivalent H20 | g | 19.5 | 26.4 | 18.0 | 26.9 | 26.6 | 39.0 | 18.1 |
| % Void | % | 33.9% | 32.4% | 24.5% | 25.2% | 22.8% | | 34.6% |
| % Moisture | % | 66.6% | 56.0% | 62.3% | 62.4% | 59.9% | | 59.6% |
| Dens. W/void HTO | g/ml | 1.25 | 1.51 | 1.41 | 1.45 | 1.40 | | 1.41 |
| Dens. W/void Air | g/ml | 0.91 | 1.18 | 1.17 | 1.20 | 1.17 | | 1.06 |
| Dens. Of Damp Resin | g/ml | 1.38 | 1.75 | 1.55 | 1.61 | 1.52 | | 1.62 |
| HTO adsorbed | Ci | 2.35 | 3.17 | 2.23 | 3.33 | 3.30 | 4.87 | 2.25 |
| Rated Decrease | % | 43% @ 31 g | 40% @ 31 g | 27% @ 37 g | 37% @ 39 g | 35% @ 53 g | 60% @ 32 g | 41% @ 31 g |
| Max % Change | % | −56.69 | −45.06 | −31.86 | −44.50 | −48.83 | −78.89 | −55.06 |
| % Pref. HTO Adsorption | % | 3.30% | 9.69% | 5.56% | 8.13% | 8.12% | | 6.67% |
| Calc. Mass | | 3.19 | 5.05 | 3.96 | 5.62 | 5.76 | 2.60 | 4.16 |
| Calc. Vol. | | 1.50 | 4.06 | 2.77 | 4.14 | 4.09 | 3.00 | 2.78 |
| Data Quality | | Good | Good | Good | Good | Fair | Fair | Good |

Note: Single module runs have a volume of 650 mL, while the two module runs have a volume of 1300 mL.

What is claimed is:

1. A process for separating isotope water molecules from contaminated water comprising:

a) providing a separation material containing metal cations with multiple waters of hydration supported on an inorganic substrate selected from the group consisting of aluminas, silicas, aluminum-silicates, and zeolites;

b) contacting said separation material with said contaminated water, whereby waters of hydration on said separation material are selectively replaced by said isotope water molecules; and c) separating said isotope water molecules from said separation material by conveying heated air at a temperature of at least about 140° C. through said separation material.

2. The process of claim 1, wherein said air is at a temperature of from about 140° C. to about 300° C.

3. The process of claim 1, wherein said metal cations are selected from the group consisting of aluminum, magnesium, zinc, copper, cobalt and chromium cations.

4. The process of claim 1, wherein said isotope water molecules are selected from the group consisting of HTO, $T_2O$, HDO, $D_2O$, and mixtures thereof.

5. The process of claim 1, wherein said separation material is in the form of particles having a mesh size of from 15 to 400.

6. The process of claim 1, wherein said separation material has the structure $$\left( \begin{array}{c} R \\ / \diagdown \\ O \end{array} \!\!\!\!- SO_3A - Y - \right)$$

wherein R is alumina, silica, or mixtures thereof, A is an aluminum, magnesium, copper, zinc, or cobalt cation, and Y is a sulfate, nitrate, chloride, or phosphate anion.

7. The process of claim 1, wherein each of said metal cations has from about 5 to about 20 associated waters of hydration.

* * * * *